United States Patent Office 2,740,758
Patented Apr. 3, 1956

2,740,758
DRILLING MUD WITH QUENCHED FLUORESCENCE

Carl F. Cross, Griffith, and Stephen J. Wayo, Whiting, Ind., assignors to Sinclair Refining Company, New York, N. Y., a corporation of Maine No Drawing. Application December 10, 1954, Serial No. 474,604

2 Claims. (Cl. 252—8.5)

This invention relates to the detection of crude oil in subterranean formation. More particularly, the present invention relates to the detection of crude oil in subsurface formation by observing samples of subterranean formations recovered during the drilling of wells into the formations.

It is well known that all crude oils fluoresce when exposed to irradiations of ultraviolet light. This fact has formed the basis of numerous attempts to detect the presence of crude oil when drilling in subterranean formations. For example, a proposed method of detecting crude oil involves the examination of circulating drilling muds for fluorescence upon return of the mud to the surface. Crude oil absorbed by or occluded to the mud, even in minute amounts, would evidence fluorescence under ultraviolet light. This method has been undesirable because of the fact that most oil base drilling muds are fluorescent by virtue of the materials employed in making them. For example, diesel oils, fuel oils, and the like containing fluorescent aromatics are commonly employed in preparing drilling muds in preference to non-fluorescent paraffinic oils because of the obvious economic advantage in so doing and the fact that they generally are the better bit lubricants. Accordingly, the success of this method of detection is dependent upon a comparison of the fluorescence of the mud prior to and after exposure to subsurface formations and requires a very high degree of skill. Consequently, it is not surprising that the uncertainties involved militate against use of this system.

It has now been discovered that crude oil occurring in subsurface formations can be detected in a rapid and efficient manner. It has also been discovered that the presence of and the proximity to crude oil in subsurface formations can be detected in a manner which does not require the comparison of relative fluorescences. These advantages are obtained by virtue of the present invention in drilling fluids.

By the present invention a drilling fluid composition containing fluorescent petroleum oil constituents is provided which does not evidence fluorescence when exposed to ultraviolet light. This advantageous property is imparted to drilling fluids or muds containing fluorescent petroleum oil constituents by incorporating nitrobenzene in the mud, a substance which we have found to be capable of quenching this fluorescence. The quenching substance is employed in an amount just sufficient to quench the fluorescence of the petroleum oil constituents of the mud composition. Success of the use of these novel muds as an agency for the detection of subsurface crude oil depends upon the use of an exact quantity of nitrobenzene. While detection of crude oil is feasible where a small excess of nitrobenzene is employed, maximum sensitivity results upon using no more than a quantity precisely sufficient to quench fluorescence due to the oil constituents of the mud present by virtue of the materials employed to make the mud. By employing this defined quantity of quenching medium, the presence of minute quantities, e. g., as little as several drops, of crude oil in the mud upon its return from the subsurface will be apparent.

Thus, compositions of the present invention comprise essentially an oil base drilling mud, where the oil base contains petroleum constituents which fluoresce, and a quantity of nitrobenzene exactly sufficiently to quench the fluorescence of the oil components of the mud composition. The quantity of nitrobenzene necessary to quench the fluorescence of an oil base drilling mud is dependent upon several factors. For example, the fluorescence of each oil differs depending upon such considerations as the nature and concentration of the various components. Notwithstanding, this situation, determination of the quantity of nitrobenzene to be employed is well within the skill of the average laboratory technician and can be accomplished, for example, by dropwise addition of the quenching medium to a known quantity of drilling fluid and observing the quantity of nitrobenzene needed just to quench the fluorescence. For example, we have determined that the addition of 0.02 cc. of nitrobenzene to one cc. of each of a fluorescent fuel oil blend consisting of 70 volume per cent of a straight run Mid Continent distillate oil and 30 volume per cent of a Mid Continent light catalytic cycle oil and a fuel oil consisting of Mid-Continent distillate oil successfully quenches their fluorescence. The addition of a single drop of a blend of a crude oil from Velma, Cook County, Illinois and an Oklahoma black crude to the quenched fuel oil was detected upon exposure to ultraviolet light. Similarly to a drilling mud compounded by mixing one cc. of straight run distillate with about 10 grams of yard clay was added a drop of nitrobenzene. Fluorescence was again evidenced in the mud upon addition of a drop of crude to it and exposure of the mixture to ultraviolet light. In general it has been found that on the order of about 2 volume per cent of nitrobenzene, based on the oil component, is needed to quench mud fluorescence which employ the common fuel oils as the base oil.

The oil base drilling fluids to which the nitrobenzene is added to produce the compositions of the present invention can be made with any of the known materials commonly employed in the preparation of drilling muds. For example, the fluorescent material-containing oil base which forms the major component, is preferably of mineral origin and can be crude petroleum, a distillate material or a residuum. Diesel oils and fuel oils are very satisfactory components. Heavier materials such as tars, cycle oils, cracked residua, heavy extracts and the like are especially well suited, particularly from an economic point of view. Where these heavy materials are employed it is desirable that they be blended with less viscous material such as gas oil. Weighting materials which can be employed include, for example, bentonite, yard clay, crushed oyster shells, barites, hematite, magnetite and similar wettable heavy materials; weighting materials are commonly used in finely divided form. Plastering components, such as blown or polymerized asphalt or petrolatum, and stabilizing or emulsifying agents such as rosin, resin soap, tall oil soap, fatty acid soap, alkali metal soaps and the like can be present.

The new drilling fluid compositions can be compounded by any known technique. It is preferred to form the fluid of the common materials in the normal manner and while still in stirring-equipped apparatus to incorporate the quenching material. By such procedure substantial uniformity of the composition can be insured. Alternatively, commercially available drilling fluids can be employed in preparing the new compositions by incorporating the proper quantity of nitrobenzene. Special conditions of temperature and pressure need not be served in compounding the fluid compositions of the present invention.

In actual practice, the novel drilling fluids of the present invention are employed in the manner conventional  use of drilling fluids. That is, drilling muds are pumped through drill pipes and the usual opening in drill s, during a rotary drilling operation, to lubricate the  and provide a seal against fluid leakage from the formation. Contact of the mud with the formation being lled is thus effected and bits of the formation, i. e., ttings, are picked up by the mud. The mud then sses upwardly to the surface through an annular space out the drilling pipe. Upon return of mud to the rface, it can be exposed to irradiations of ultraviolet ht. Fluorescence will be observed if crude oil is sent in the cuttings occluded by the mud. Specifically, bentonitic type mud containing a diesel oil as the oil mponent is converted to a composition according to  present invention by uniformly incorporating nitronzene into it as above described. The resulting composition is placed in the mud pit at a drilling site and introduced into the well by being withdrawn from the  by means of a suitable pump and conducted to the ll head. The mud is continuously forced into the ll, by pumping, whereby it passes downwardly to the illing face, through the drill bit holes and into contact th the face of the formation at the point of drilling where ttings are picked up. The mud then passes up the nular space formed by the drilling pipe and the well lining. At the surface, a minor portion of the mud is by-passed, from the conduit returning the mud to the mud pit, to a testing unit where it is exposed to ultraviolet light, in a dark room, to determine presence of fluorescence.

What is claimed:

1. A drilling fluid composition consisting essentially of a fluorescent-component-containing-oil base drilling fluid and nitrobenzene in an amount equal to the quantity necessary to quench the fluorescence of the fluid.

2. A drilling mud composition consisting essentially of a fluorescent aromatic oil containing oil base drilling mud and nitrobenzene in an amount equal to the quantity necessary to quench the fluorescence of the mud.

References Cited in the file of this patent

UNITED STATES PATENTS 2,698,833    Wilson _____ Jan. 4, 1955

OTHER REFERENCES

Evstigneev et al.: Quenching of the Fluorescence of Chlorophyll, article in Chemical Abstracts, vol. 45, page 1872, 1939.

Heintz: La Florescence des Polystyrolenes, article in Journal de Chimie Physique, vol. 48, pp. 545–551, 1951.

Solid Luminescent Materials, page 187, Symposium of Cornell University, pub. 1948, by John Wiley and Sons of New York.